(12) United States Patent
Pilard

(10) Patent No.: US 8,264,925 B2
(45) Date of Patent: Sep. 11, 2012

(54) OPTICAL DISC WITH PROTECTION CODE, METHOD FOR OBTAINING THE PROTECTION CODE AND RESPECTIVE APPARATUS FOR READING OF DATA

(75) Inventor: Gael Pilard, Marly (FR)

(73) Assignee: Thomson Licensing (FR)

( * ) Notice: Subject to any disclaimer, the term of this patent is extended or adjusted under 35 U.S.C. 154(b) by 0 days.

(21) Appl. No.: 13/066,520

(22) Filed: Apr. 15, 2011

(65) Prior Publication Data

US 2011/0261665 A1 Oct. 27, 2011

(30) Foreign Application Priority Data

Apr. 21, 2010 (EP) .................................. 10305414

(51) Int. Cl.
*G11B 7/00* (2006.01)
(52) U.S. Cl. ................ 369/47.36; 369/47.38; 369/53.21
(58) Field of Classification Search ............... 369/53.21, 369/47.1, 47.36, 47.38, 275.3, 53.43, 59.25, 369/53.44, 53.37, 53.3, 47.43
See application file for complete search history.

(56) References Cited

U.S. PATENT DOCUMENTS

2003/0214886 A1 * 11/2003 Sakamoto et al. ......... 369/13.06

FOREIGN PATENT DOCUMENTS

| EP | 1213710 | 6/2002 |
| EP | 2136363 | 12/2009 |
| WO | WO2009/109653 | 9/2009 |
| WO | WO2009109614 | 9/2009 |

OTHER PUBLICATIONS

EP Search Report dated Sep. 6, 2010.

* cited by examiner

*Primary Examiner* — Nabil Hindi
(74) *Attorney, Agent, or Firm* — Jack Schwartz & Associates, PLLC

(57) ABSTRACT

The optical disc comprises a substrate layer, a read-only data layer having a pit/land data structure including user data and control data arranged in tracks on the substrate layer, and a nonlinear layer with a super-resolution structure disposed on the data layer, wherein the control data are correctly readable only by including a reverse rotation of the disc. The control data include in particular a protection code for the disc, for example a copy protection code, so that the user data of the disc are only readable after reading of the control data.

15 Claims, 4 Drawing Sheets

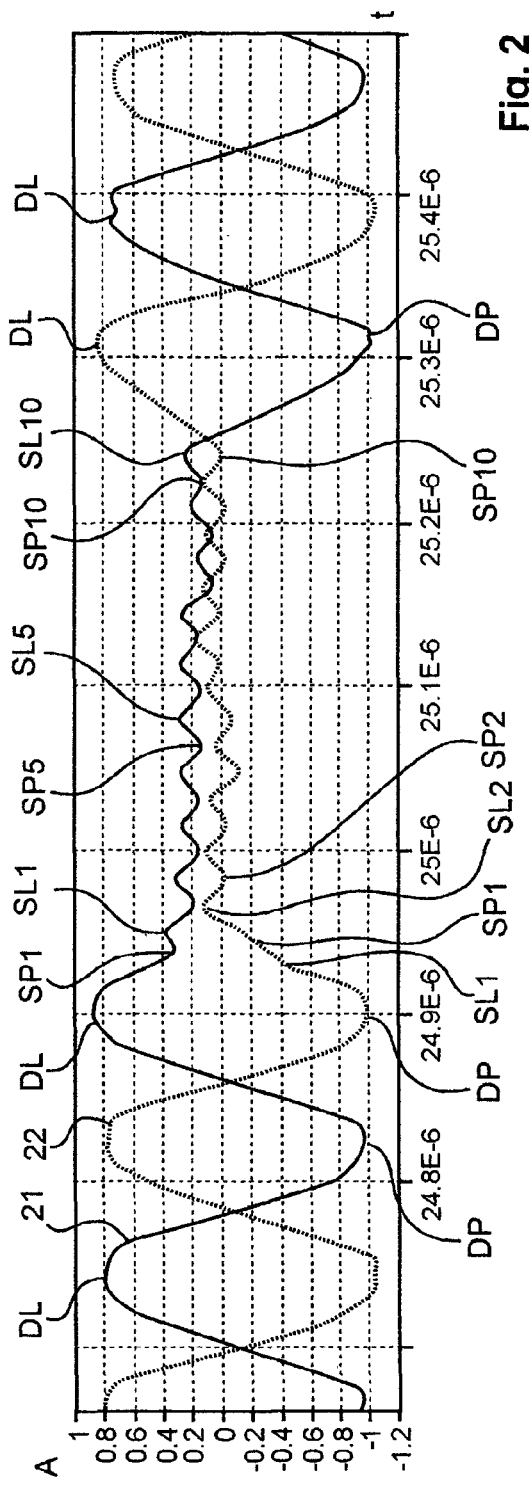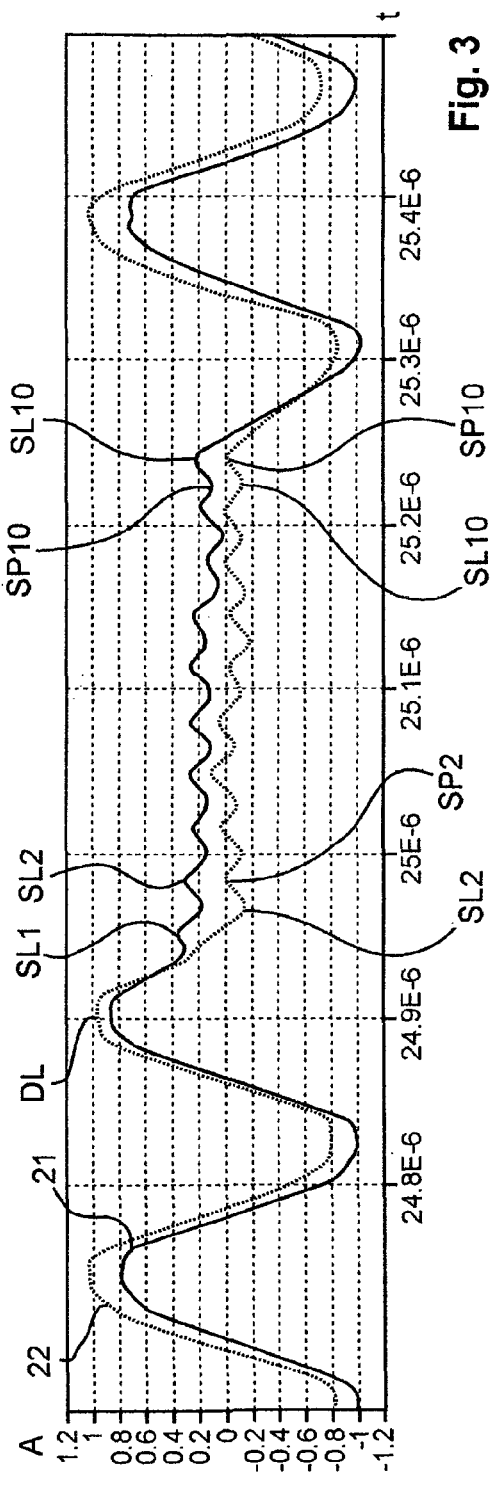

OPTICAL DISC WITH PROTECTION CODE, METHOD FOR OBTAINING THE PROTECTION CODE AND RESPECTIVE APPARATUS FOR READING OF DATA

This application claims the benefit, under 35 U.S.C. §119 of EP Patent Application 10305414.4, filed 21 Apr. 2010.

TECHNICAL FIELD OF THE INVENTION

The present invention relates to an optical disc comprising a substrate layer, a read-only data layer having a data structure including user data and control data arranged in tracks on the substrate layer, and a nonlinear layer disposed on the data layer, wherein the control data include a protection code for the disc. The invention relates further to a method for obtaining the protection code and a respective apparatus for reading of data.

BACKGROUND OF THE INVENTION

Optical storage media are media in which data are stored in an optically readable manner, for example by means of a laser and a photodetector, being integrated within a pickup. The photodetector is used for detecting reflected light of the laser beam when reading data on the storage medium. In the meanwhile a large variety of optical storage media are known, which are operated with different laser wavelength, and which have different sizes for providing storage capacities from below one Gigabyte up to 50 Gigabyte (GB). The formats include read-only formats such as Audio CD and Video DVD, write-once optical media such as CD-R and DVD-R, DVD+R, as well as rewritable formats like CD-RW, DVD-RW and DVD+RW. Digital data are stored on these media along tracks in one or more layers of the media.

The storage medium with the highest data capacity is at present the Blu-Ray disc (BD), which allows to store up to about 50 GB on a dual layer disc. For reading and writing of a Blu-Ray disc an optical pickup with a laser wavelength of 405 nm and a numerical aperture of 0.85 is used. On the Blu-Ray disc a track pitch of 320 nm and a mark length from 2T to 8T or 9T is used, where T is the channel bit length and wherein 2T corresponds with a minimum mark length of 138, 149 or 160 nm.

The diffraction limit of optical instruments as described by the Abbe theory is about lambda/2NA, which is 238 nm for a Blu-Ray type pickup with a wavelength lambda=405 nm and a numerical aperture NA=0.85. This theoretical minimal detectable length from the diffraction theory is corresponding to a period of the pattern function, which is formed of a pit and of a land having the same length. The smallest detectable element of such a system is a pit or a land having a length of about lambda/4NA, which corresponds for a Blu-Ray type pickup with a length of 120 nm.

New optical storage media with a super-resolution structure offer the possibility to increase the data density of the optical storage medium by a factor of two to four in one dimension as compared with the Blu-Ray disc. This is possible by including a nonlinear layer, which is placed above a data layer of the optical storage medium, and which significantly reduces the effective size of a light spot used for reading from or writing to the optical storage medium. The nonlinear layer can be understood as a mask layer because it is arranged above the data layer and for some specific materials only the high intensity center part of a laser beam can penetrate the mask layer. Further, semiconductor materials can be used as a nonlinear layer, e.g. InSb, which show a higher reflectivity in the center part of the focused laser beam, and which center reflectivity is dependent on the pit structure of the corresponding data layer. Therefore, the super-resolution effect allows to record and read data stored in marks of an optical disc, which have a size below the optical resolution limit of lambda/4NA of a corresponding pickup.

The nonlinear layer is often called a super-resolution near-field structure (Super-RENS) layer because it is assumed that for some specific materials, the optical effect of reducing the effective spot size of the laser beam is based on a near-field interaction between the marks and spaces of the data layer and the nonlinear layer. Super-RENS optical discs comprising a super resolution near-field structure formed of a metal oxide, a polymer compound or a phase-change layer comprising a GeSbTe or AgInSbTe are known.

An optical disc comprising a substrate layer, a read-only data layer having a data structure including user data and control data arranged in tracks on the substrate layer, and a nonlinear layer disposed on the data layer wherein the control data include a protection code is known from EP-A-2136363.

BRIEF SUMMARY OF THE INVENTION

The optical disc comprises a substrate layer, a read-only data layer having a pit/land data structure including user data and control data arranged in tracks on the substrate layer, and a nonlinear layer with a super-resolution structure disposed on the data layer, wherein the control data are correctly readable only by including a reverse rotation of the disc. The control data include in particular a protection code for the disc, for example a copy protection code, so that the user data of the disc are only readable after reading of the control data.

The optical disc utilizes specific characteristics of a super-resolution effect of the nonlinear layer, in that for some kind of pit/land sequences, for example a super-resolution land or pit following a large pit, super-resolution pits and/or lands are only detected when the disc is reversely rotating, but which are not detected when the disc is rotating in normal direction. By scanning the area on the disc including the control data in a first step using a forward rotation and in a second step using a reverse rotation, a first and a second data signal are obtained, which are different in that some of the smallest pits and/or lands are not reproduced due to the nature of the super-resolution effect.

The control data include for example large pits and lands being above a resolution limit and small pits and lands being below the resolution limit of a pickup for reading of the data, and wherein the large and small pits and lands of the control data are arranged such that a correct reading of the control data is only possible by reversing the disc rotation with regard to the disc rotation for reading of the user data.

The large pits and lands are in a preferred embodiment 6T-8T pits and lands and the small pits and lands are 2T and/or 3T pits and lands, and wherein the control data comprise at least a 2T and/or 3T land followed by a 6T-8T pit and/or a 6T-8T land followed by a 2T and/or 3T pit.

In a further aspect of the invention, the nonlinear layer covers only the control data, but not the user data of the data layer. For reading of the user data therefore no super-resolution effect is required. The data structure of the user data may correspond for example with the data structure of a Blu-Ray disc or a DVD.

An apparatus for reading data of the optical disc comprises a pickup for reading the user data and the raw control data from the disc, a motor and a servo controller for rotating the optical disc in forward and reverse direction and a microprocessor for the calculation of the protection code. Advantageously, no error correction is applied when reading the control data for the calculation of the protection code, or an error correction is applied which does not include 2T and/or 3T lands following a 5T-8T pit and/or 2T and/or 3T pits following a 5T-8T land.

BRIEF DESCRIPTION OF THE DRAWINGS

Preferred embodiments of the invention are explained in more detail below by way of example with reference to schematic drawings, which show.

DETAILED DESCRIPTION OF PREFERRED EMBODIMENTS

Figure 1:
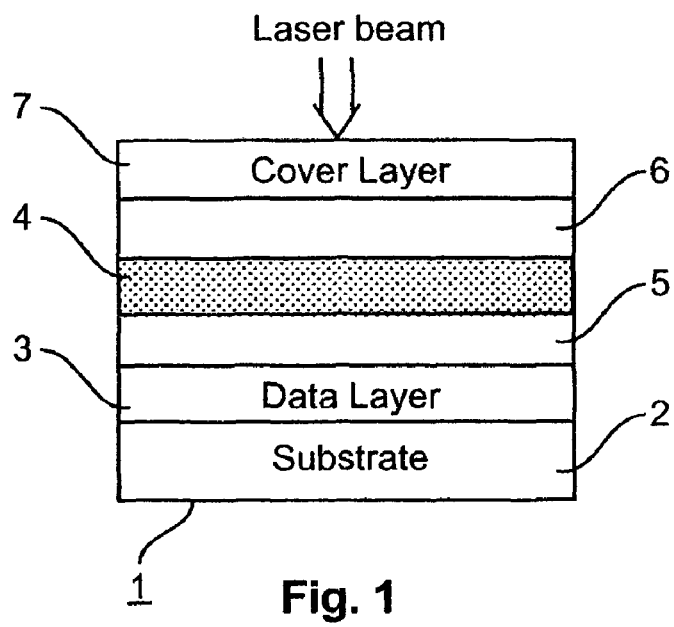
FIG. 1 an optical disc in a sectional view with a layer stack comprising a substrate, a data layer and a nonlinear layer, FIG. 2 a data signal of a control data sequence of the optical disc rotating in normal rotation direction together with the data signal for the same control data sequence when the optical disc is rotating in reverse direction, FIG. 3 the data signal of the control data sequence of FIG. 2 for the normal rotation direction together with the mirrored data signal obtained when the optical disc is rotating in reverse direction, FIG. 4 a diagram depicting measured relative amplitudes of small and large pits, FIG. 5 a diagram for explaining the measurement results shown in FIG. 2, FIG. 6 a data signal of a control data sequence including not detectable data when using normal rotation direction of the optical disc, and FIG. 7 the data signal for the control data sequence of FIG. 6 using reverse rotation direction of the optical disc.

In FIG. 1 an optical storage medium 1 is shown in a cross section in a simplified manner. The optical storage medium 1 is in particular a read-only (ROM) optical storage disc. On a substrate 2 a data layer 3 is arranged which may comprise a reflective metallic layer, for example an aluminum layer. The data layer 3 has a data structure consisting of marks and spaces arranged on essentially parallel tracks. For a ROM disc, the marks and spaces consist of pits and lands, the pits being molded or embossed on the surface of substrate 2 for representing the data layer 3. On the data layer 3 a first dielectric layer 5 is arranged and on the dielectric layer 5 a nonlinear layer 4 is arranged for providing the function of a mask layer for utilizing a super-resolution effect. The nonlinear layer 4 comprises in particular a super-resolution structure for providing the super-resolution effect, e.g. a super-resolution near-field structure (Super-RENS).

Above the nonlinear layer 4 a second dielectric layer 6 is disposed. As a further layer, a cover layer 7 is disposed on the second dielectric layer 5 as a protective layer. For reading the data of the data layer 3, a laser beam is applied in this embodiment from the top of the storage medium 1, penetrating first the cover layer 7. The optical storage medium 1 is in particular an optical disc having outside dimensions similar to DVDs and CDs. The first and second dielectric layers 5, 6 comprise for example the material $ZnS$—$SiO_2$. The substrate 2 and the cover layer 7 may consist of a plastic material, as known from DVDs and CDs. The layers of the storage medium 1 are arranged particularly as a layer stack. The nonlinear layer 4 comprises for example a semiconductor material of the III-V semiconductor family, e.g. GaSb, InAs or InSb, or a phase-change material, for example a chalcogenide material, as the super-resolution structure.

The super-resolution effect allows detecting pits, which have a size, in particular a length, which is below the optical resolution limit of a corresponding apparatus for reading of the data of the optical storage medium. It has been demonstrated that the super-resolution detection of an optical disc comprising a phase-change material, also other materials like semiconductor materials, is related to a local change of the optical properties of the non-linear layer 4.

Recent experiments have shown that for some situations the smallest pits and lands, being below a resolution limit of a pickup for reading of the data, cannot be decoded correctly for an optical disc comprising a super-resolution structure, when they follow a large land, respectively a large pit. For example, when a 2T land, which is a land having a length being below the resolution limit of the pickup, follows a large pit, e.g. a 5T or 8T pit, the 2T land will not be detected by the pickup. The channel bit length T for the optical disc 1 is for example 40 nm or 50 nm, a 2T pit and 2T land has therefore a length of 80 nm or 100 nm.

2T and/or 3T pits and lands having a length being below the resolution limit of the pickup will be called in this context super-resolution pits and lands, because they can be detected only by using a super-resolution effect. 5T-8T pits and lands have a length being above the resolution limit of the pickup are called in this context diffractive pits and lands, because for the detection a diffractive effect is effective, as known e.g. from Blu-Ray discs. This phenomenon can be seen in FIG. 2, which shows that a super-resolution pit being separated by a super-resolution land from a preceding large diffractive pit cannot be detected.

Graph 21 of FIG. 2 shows detection of a data sequence of alternatingly 10 pits SP1-SP10 and 10 lands SL1-SL10 having a length of each 80 nm, which are preceded by a 400 nm diffractive land DL and followed by a 400 nm diffractive pit DP. Shown is the amplitude A as a function of time t. The laser power is 2.8 mW. The data structure is arranged on an optical disc comprising a nonlinear layer provided by an InSb layer as the super-resolution structure. As can be seen, the first super-resolution pit SP1 following the diffractive land DF is clearly resolved, also the following sequence of super-resolution pits and lands. After the last super-resolution land SL10 follows the diffractive pit DP of length 400 nm, after which follows a diffractive land DL of same size.

But when the disc is rotated in reverse direction for reading the same sequence of super-resolution pits and lands, the situation is different: The sequence of the 10 super-resolution pits and lands begins with a super-resolution land SL1, after a preceding diffractive pit DP. The sequence of the 10 super-resolution pits and lands ends correspondingly with a super-resolution pit SP10 followed by a diffractive land DL. The data signal obtained with the pickup when reading the data in reverse direction, graph 22, is displayed in FIG. 2 in correspondence with the data signal of graph 1. As can be seen, after the last diffractive pit DP of graph 2 the signal amplitude is rising because super-resolution land SL1 is following, but the subsequent super-resolution pit SP1 is not resolved. Only the next super-resolution land SL2 is resolved, also the subsequent super-resolution pits and lands.

This is a surprising effect, because the super-resolution pit SP1 following a large diffractive land DL is clearly resolved as shown by graph 21, but the super-resolution pit SP1 following a large diffractive pit DP is not resolved according to graph 22. Correspondingly, also the super-resolution land SL1 between the diffractive pit DP and super-resolution pit SP1 is not detected. Normal rotation direction is in particular the disc rotation used for reading of the user data and is in this embodiment a counterclockwise rotation, and the reverse rotation direction is a clockwise rotation.

For a better comparison of graph 22 with graph 21, in FIG. 3 graph 22 is mirrored with regard to the amplitude and displayed together with graph 21, so that the signal of the pits and lands of graph 21 correspond with the signals of graph 22. Graph 22 of FIG. 3 confirms that the first super-resolution pit and first super-resolution land following a large diffractive pit are not detected by the pickup. Super-resolution land SL2 and super-resolution pit SP2 are detected, also the subsequent super-resolution pits SP3-SP10 and super-resolution lands SL3-SL10.

One of the reasons for this effect is, that the data signal obtained by the pickup for the super-resolution pits and lands is very small with regard to the data signals obtained for the diffractive pits and lands. The relative amplitudes of small and large pits have been measured and are displayed in FIG. 4, which shows the resolution R of pits as a function of the pit length L. The resolution is defined in this context as the amplitude of a pit of a given length, divided by the amplitude of a pit having a length of 600 nm. Investigated are pits beginning with a smallest pit length of 100 mn and including pits with stepwise increasing pit length of 50 nm up to the largest pit length of 600 nm. The pits are arranged on a super-resolution optical disc comprising InSb as the super-resolution material of the nonlinear layer.

Figure 4:
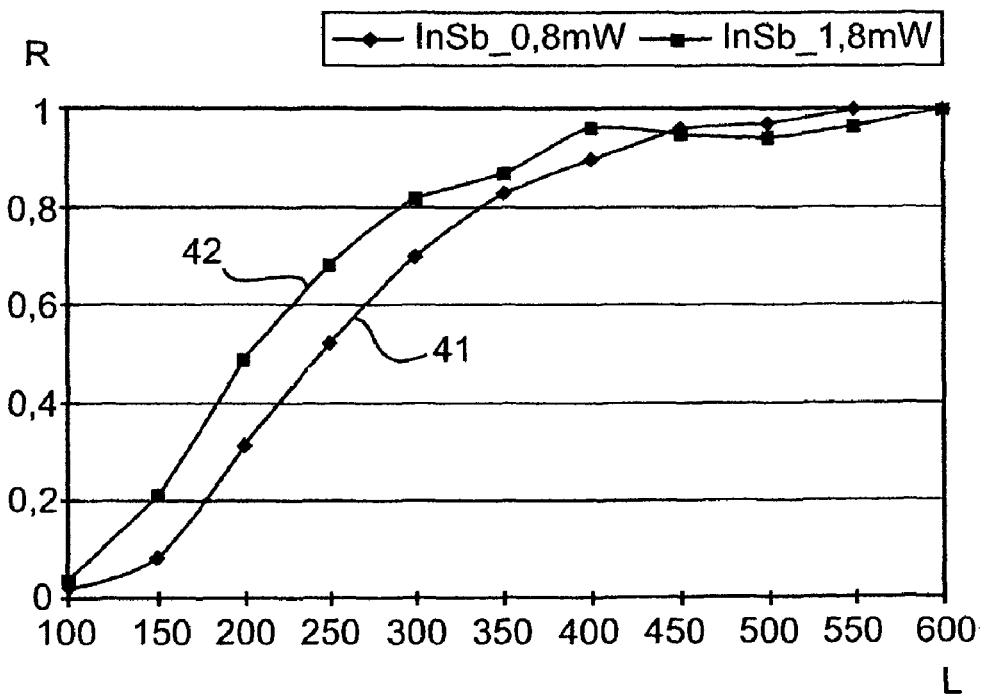

Graph 41 shows the resolution of the pits obtained when using a laser power of 0.8 mW, which is not sufficient for providing a super-resolution effect of the nonlinear layer. Graph 42 shows the resolution of the same pits when using a laser power of 1.8 mW, which is sufficient for providing a super-resolution effect. As can be seen in FIG. 4, the super-resolution effect is not only effective below the pit length of 150 nm, which is about the resolution limit of the pickup, but also for larger pit lengths. Further, for the pit length of 100 nm, the resolution R is very small in comparison with the larger pits, even for the laser power of 1.8 mW, and therefore the amplitude of the data signals obtained for super-resolution pits and lands of 100 nm length or below is correspondingly very small. The pickup used for these measurements, also for the other measurements of FIG. 2 and FIGS. 5-7, is a Blu-Ray type pickup having a laser wavelength of 405 nm and a numerical aperture NA=0.85. The resolution limit of this pickup is due to the diffraction theory correspondingly about 120 nm mark length, mark length being referred here to a land or to a pit length.

Further, simulations for explaining the super-resolution effect have shown that the super-resolution effect is mainly provided by the super-resolution lands, and that the super-resolution pits provide only a comparatively small signal with regard to the super-resolution lands. This explains why a super-resolution land and a subsequent super-resolution pit following a large diffractive pit are not detected, as shown by graph 22 of FIG. 2.

Figure 5:
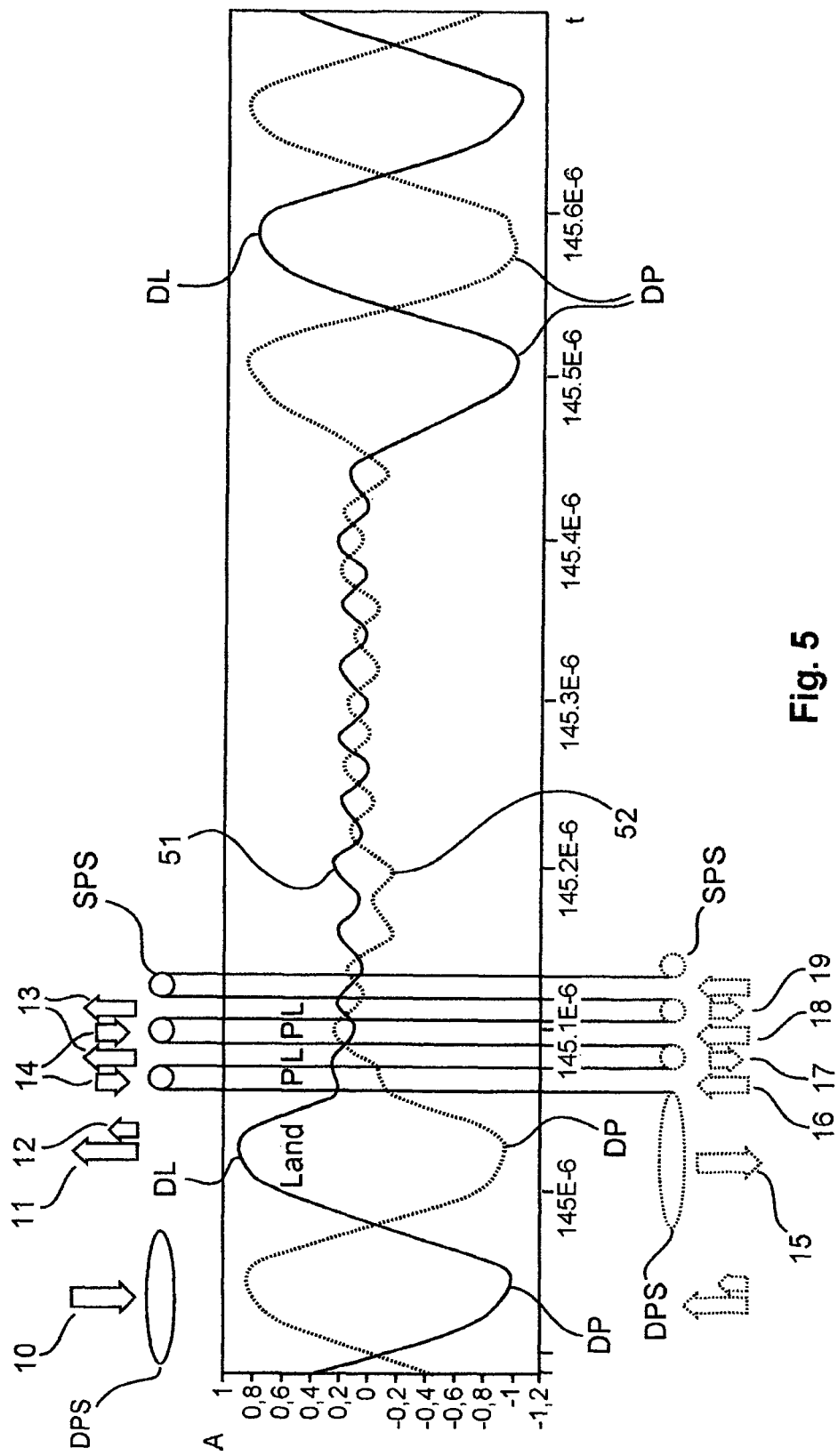
Figure 6:
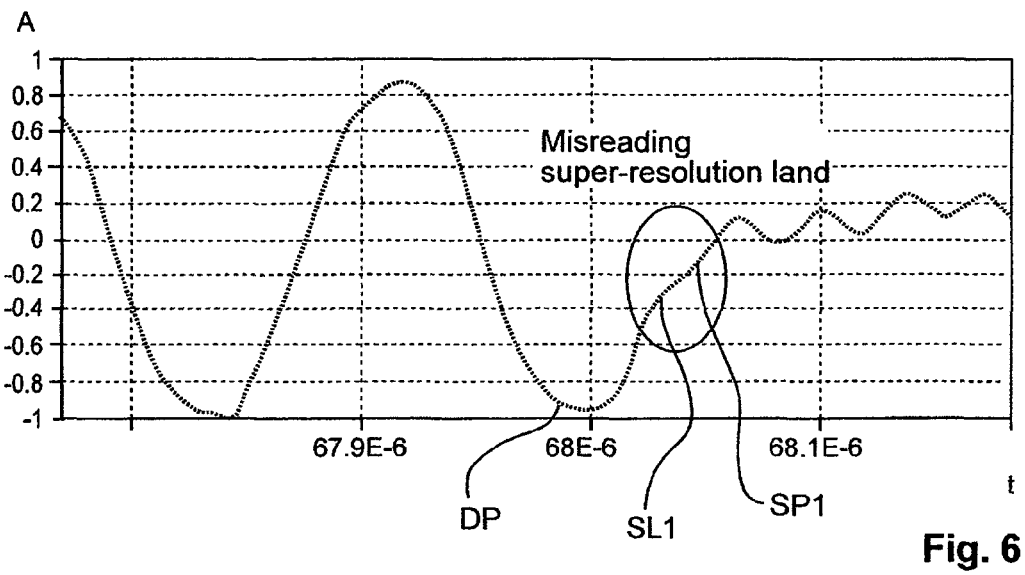

This effect is explained in more detail with regard to FIG. 5. Graph 51 shows a sequence of 10 super-resolution pits and 10 super-resolution lands, arranged between a preceding diffractive land DL and followed by a diffractive pit DP, similar to graph 21 of FIGS. 2 and 3. As a difference, the length of the super-resolution pits and lands is each 100 nm and the length of the diffractive pits and lands is each 400 nm. Graph 52 of FIG. 5 shows the data signal for these pits and lands, but using a reverse rotation of the optical disc. Again, the first super-resolution land and first super-resolution pit following the diffractive pit DP are not resolved during data reading in reverse direction, but only the subsequent super-resolution pits and lands, in agreement with FIG. 2.

Indicated in FIG. 5 is in addition the size DPS of the diffractive pits and the size SPS of the super-resolution pits. Also the corresponding reflectivity for the pits and lands is indicated by arrows, as originating from the diffractive effect and the super-resolution effect. The first diffractive pit DP, graph 51, provides a low reflectivity 10 and the subsequent diffractive land DL a high reflectivity 11. For the diffractive land DL, also reflectivity 12 is shown, provided in addition by the super-resolution effect, in accordance with FIG. 4. The super-resolution lands have also a higher reflectivity 13 and the super-resolution pits have a lower reflectivity 14, but for the super-resolution pits, the reflectivity 14 provides only a much smaller contribution to the data signal in comparison with the data signal of the super-resolution lands. This explains why the first super-resolution land after diffractive land DL is clearly resolved in graph 51 and therefore also the first super-resolution pit after diffractive land DL.

But the situation is different, when the disc is rotated in reverse direction, graph 52: The diffractive pit DP of size DPS provides a reflectivity 15. The first super-resolution land following this diffractive pit DP provides a large signal contribution 16 leading to a rise of the amplitude of the data signal, but the subsequent super-resolution pit provides only a small signal contribution 17 with regard to the signal contribution of the preceding super-resolution land. The amplitude of the data signal is therefore still increasing with the consequence, that the first super-resolution land and correspondingly also the first super-resolution pit of the super-resolution data sequence are not detected by the pickup according to graph 52. Only the subsequent super-resolution land having reflectivity 18 and the subsequent super-resolution pit having reflectivity 19 are detected.

This allows including control data on the disc, which have the function of a protection code, e.g. a copy protection code. A super-resolution land SL1, e.g. a 2T or 3T land, cannot be detected when it follows a large pit DP, e.g. a 5T-8T pit, which is a diffractive pit. Also a super-resolution pit SP1, e.g. a 2T or 3T pit, following the super-resolution land SL1 after the large pit is not detected as shown in more detail in FIG. 6.

Figure 7:
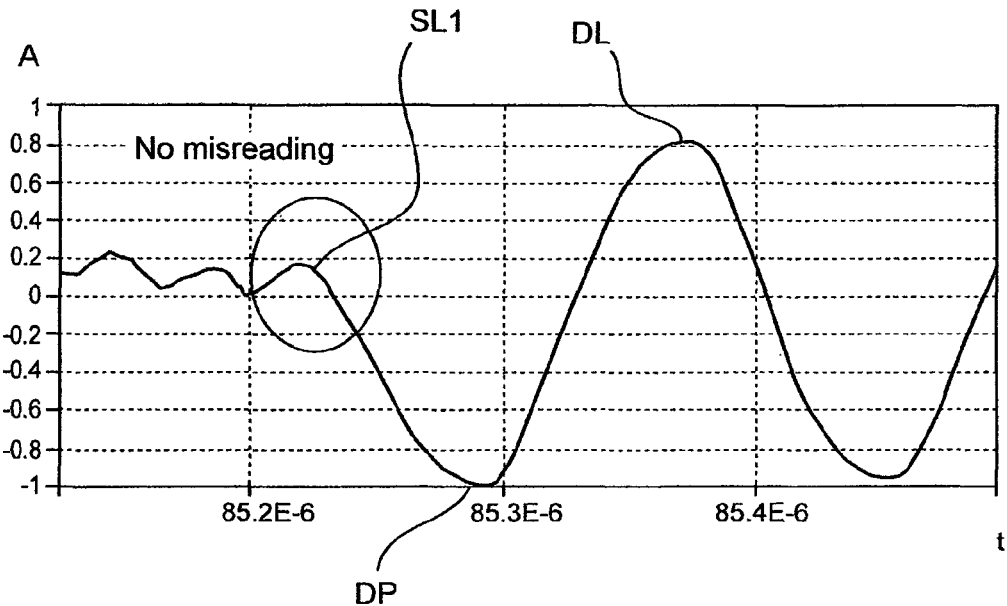

When the rotation direction of the disc is changed to reverse rotation, the small land SL1 is preceding the diffractive pit DP, as shown in FIG. 7. The data which cannot be decoded during normal rotation of the disc, FIG. 6, therefore can be clearly decoded when using a reverse rotation of the disc. By using a data sequence of this kind, therefore some code can be hidden on the disc within the control data, which cannot be read by using only a normal rotation of the disc. The control data include in particular all necessary information for reading the user data of the optical disc. The user data include the wanted information data for a user, for example a movie or a computer game.

An apparatus for reading of the optical disc comprises a pickup for reading of the user data and the control data, a microprocessor for calculating the protection code and a motor and a respective servo controller which allows rotating the disc in forward direction as well as in reverse direction.

For reading of the control data, first the protection code of the disc has to be verified. To find the protection code, the control data comprising the protection code has to be read a first time including forward rotation of the disc for obtaining a first data signal and a second time using reverse rotation of the disc, for obtaining a second data signal. By comparing the first data signal with the second data signal, e.g. by a simple calculation may be used including a subtraction or addition of both data signals, the correct protection code is obtained.

Only when the protection code is in agreement with a code stored e.g. in a memory of the apparatus, the user data can be read by the apparatus.

Applications of this system including the disc and the apparatus as described are for example for proprietary systems, e.g. a game console or similar applications. Because a reverse rotation is required for obtaining the control data of the disc, present computers comprising a disc reader and recorder or any other disc copy station cannot copy the disc, because the user data can only be accessed, when in a first step the control data are decoded. This is not possible with the present systems, because they do not allow rotating the disc in reverse direction for reading of data. The control data cannot be found also by simply using processing power of a computer or by try and error, because the protection code can be hidden within a large set of control data and the beginning of the user data may be included for example within the control data or any other control data necessary for reading of the user data. The control data are arranged therefore advantageously on an inner track or on an inner section of the disc, before the user data. The user data therefore cannot be found therefore without reading and decoding the control data.

When a computer copies the disc by just providing a 1:1 copy of the data of the disc as obtained by using a forward rotation, the copied disc does not include the hidden data within the control data. When the copied disc is therefore used for an application, the apparatus reads the control data in forward direction for obtaining the first data signal and in reverse rotation direction for obtaining the second data signal, but when the two data signals are compared, the apparatus recognizes that both data signals are the same, or in particular, that the protected code is not included on the disc. The present invention provides therefore a very effective copy protection mode.

For reading of the control data, of course no error correction can be included, which calculates any missing pits and lands. Advantageously an error correction can be used, which is not effective for the hidden code but only for the remaining part of the control data.

For a correct reading of the complete control data, a super-resolution layer is required, because specific characteristics of the super-resolution effect are used for obtaining the control data. In a further aspect of the invention, the super-resolution layer may cover therefore only the control data, but not the user data. The user data may correspond with a data structure as known for example from present DVDs or Blu-ray discs. A copy protection of this kind may be applied therefore also for current game consoles. Only the servo controller and the software of the microprocessor of the respective apparatus have to be modified for obtaining the control data by including a reverse rotation of the disc, also a pickup has to be used which allows providing a laser power sufficient for applying the super-resolution effect. The optical disc may be designed therefore similar to present optical discs, but includes control data which makes it nearly impossible for a user to read the user data of the disc.

Also other embodiments of the invention may be utilized by a person skilled in the art without departing from the spirit and scope of the present invention. The invention resides therefore in the claims herein after appended.

The invention claimed is:
1. Optical disc comprising
a substrate layer,
a read-only data layer having a pit/land data structure including user data and control data arranged in tracks on the substrate layer, and
a nonlinear layer with a super-resolution structure disposed on the data layer, wherein
the control data are correctly readable only by including a reverse rotation of the disc.

2. Optical disc according to claim 1, wherein the control data include a protection code for the disc and wherein the user data are only readable after reading of the control data and an extraction of the protection code.

3. Optical disc according to claim 1, wherein the control data are arranged on an inner track or on an inner section of the disc before the user data.

4. Optical disc according to claim 1, wherein the control data include
large pits and lands being above a resolution limit of a pickup for reading of the data and
small pits and lands being below the resolution limit of the pickup, and wherein
the large and small pits and lands of the control data are arranged such that a correct reading of the control data is only possible by reversing the disc rotation with regard to the disc rotation for reading of the user data.

5. Optical disc according to claim 4, wherein the large pits and lands are 5T-8T pits and lands and the small pits and lands are 2T and/or 3T pits and lands, and wherein the control data comprise at least a 2T and/or 3T land following a 5T-8T pit, and/or a 5T-8T land followed by a 2T and/or 3T pit.

6. Optical disc according to claim 1, wherein the nonlinear layer comprises a semiconductor material of the III-V semiconductor family, for example GaSb, InAs or InSb, or a phase-change material, for example a chalcogenide material, as the super-resolution structure.

7. Optical disc according to claim 1, wherein the nonlinear layer covers only the control data, but not the user data of the data layer.

8. Optical disc according to claim 4, wherein the resolution limit of the pickup is defined as lambda/4NA, lambda being a laser wavelength and NA a numerical aperture of the pickup.

9. Optical disc according to claim 1, comprising a cover layer above the nonlinear layer, a first dielectric layer arranged between the nonlinear layer and the data layer and a second dielectric layer arranged between the nonlinear layer and the cover layer.

10. Method for reading data from an optical disc comprising a substrate layer, a read-only data layer having a pit/land data structure including user data and control data arranged in tracks on the substrate layer, and a nonlinear layer with a super-resolution structure disposed on the data layer, comprising the steps:
reading the control data by rotating the optical disc in forward direction for obtaining a first data signal,
reading the control data by rotating the optical disc in reverse direction for obtaining a second data signal, and
calculating a protection code for the optical disc from the first and second data signal.

11. The method of claim 10, comprising the steps:
using a laser power for reading of the control data, which is above a threshold for utilizing a super-resolution effect of the optical disc.

12. The method of claim 10, with the step of using the protection code for a copy protection or for a read protection of the optical disc, and wherein the protection code is calculated by taking into account a difference, a sum, or any mathematical combination of the first and second data signals.

13. The method of claim 10, wherein the optical disc is an optical disc in accordance with claim 1.

14. Apparatus comprising a pickup for reading data of an optical disc, a microprocessor for the calculation of the protection code and a motor and a servo controller for rotating the optical disc in forward and in reverse direction, for applying a method in accordance with claim 10.

15. The apparatus of claim 14, wherein no error correction is applied when reading the control data for the calculation of the protection code, or an error correction is applied which does not include 2T and/or 3T lands following a 5T-8T pit and/or 2T and/or 3T pits following a 5T-8T land.

* * * * *